UNITED STATES PATENT OFFICE.

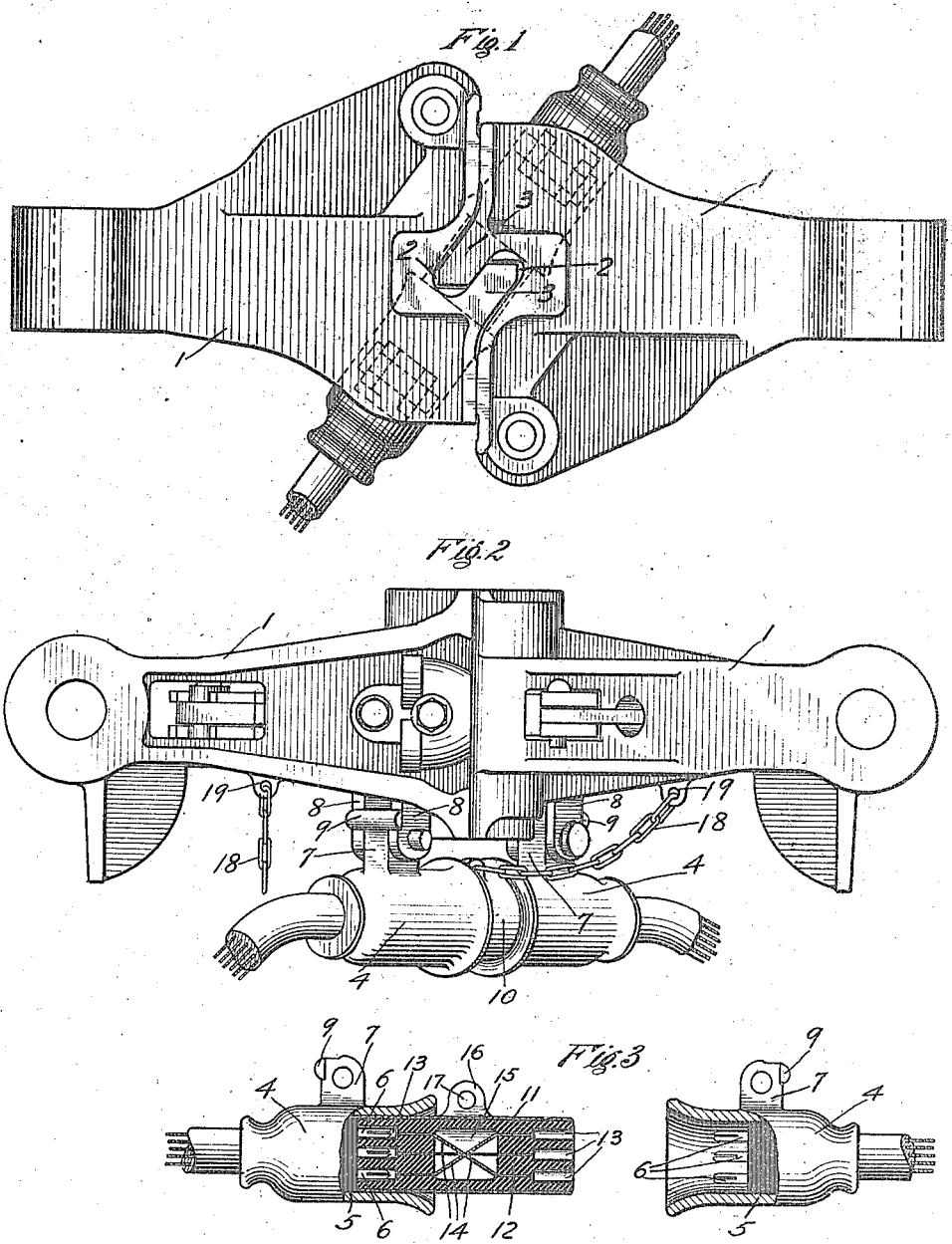

THOMAS R. BROWN, OF SPARKILL, NEW YORK, ASSIGNOR TO THE WESTINGHOUSE AIR BRAKE COMPANY, OF WILMERDING, PENNSYLVANIA, A CORPORATION OF PENNSYLVANIA.

ELECTRIC COUPLING DEVICE.

1,263,520.  Specification of Letters Patent.  Patented Apr. 23, 1918.

Application filed February 12, 1914. Serial No. 818,257.

*To all whom it may concern:*

Be it known that I, THOMAS R. BROWN, a citizen of the United States, residing at Sparkill, in the county of Rockland and State of New York, have invented new and useful Improvements in Electric Coupling Devices, of which the following is a specification.

This invention relates to coupling devices, and more particularly to an electric train wire coupling for automatically connecting the train wire terminals when cars are coupled together.

The principal object of my invention is to provide an automatic coupling of the above type which is of simple construction and is adapted to be cheaply manufactured.

In the accompanying drawing, Figure 1 is a plan view of a pair of automatic car couplers coupled up and showing my improved electric train wire coupling applied thereto; Fig. 2 a side elevation thereof; and Fig. 3 an elevational view, partly in section, of the coöperating members of two electric wire couplings in position for coupling up.

As shown in the drawings, the electric coupling is applied to a combined car and pipe coupling of the so-called tight lock type comprising a head 1 provided with an inclined recess 2 and a projection 3 adapted to engage the recess 2 of a counterpart coupling in the act of coupling, means being provided for locking the heads in the coupled position.

The final movement in coupling is therefore in the direction of the inclination of the recess 2 and where the improved electric coupling is applied to a car coupling of this type, the electric coupling members are preferably arranged in alinement with the direction of movement in coupling.

The electric train wire coupling may comprise a socket member 4 having an outwardly flaring or bell shaped mouth and containing a block 5 of non-conducting material. Secured in said block are one or more plug terminals 6 connected to corresponding train wires and having the outer ends preferably split. The socket member 4 may be suspended from the coupling head 1 by means of a lug 7 carried by said member and pivotally mounted between lugs 8 applied to the under side of the coupling head 1. The lug 7 may be provided with lateral projections 9 adapted to engage the lugs 8 when the socket member is in its horizontal member for the purpose of limiting the backward movement of the socket member when the parts are coupled up.

Electric connection between the terminals in the sockets in coupling up is effected by means of a removable plug member 10 comprising a metal casing 11 containing a block 12 of non-conducting material. At opposite ends, the block 12 is provided with one or more sockets containing metallic thimbles 13, each connected by a wire 14 to a thimble at the opposite end of the plug. A space 15 is provided in the block 12 so that the wires may be crossed in order to connect up a train wire of one car with the same train wire of the adjoining car.

The plug member 10 may be provided with a lug 16 having an aperture 17 to permit of suspending the plug member from the car when not in use, as by means of a chain 18 secured to a lug 19 on the coupling head.

In operation, when two cars are to be coupled up, the operator sees that a plug member 10 is first inserted in a socket member 4 on one car, the socket member on the other car being free. Upon movement of the cars to couple up, the plug member 10, previously inserted in one socket member, is pushed into the open socket member on the other car, thereby effecting the automatic electric connection of the train wires between the cars.

It is obvious that the electric wire coupling may be applied to other types of car couplings and if the couplings are designed to lock with a straight longitudinal movement or otherwise, the socket members should be arranged in alinement with such movement.

Having now described my invention, what I claim as new and desire to secure by Letters Patent, is:

1. In an automatic electric train line coupling, the combination with a socket member supported at the end of the car and having a series of contact terminals connected to the respective train line circuits, of a removable rigid plug member having corresponding electrical contacts at its opposite ends and adapted to make connection by a relative longitudinal movement with the socket member, said plug member being inserted in the socket member on one car and actuated by the coming together of the cars in the act of coupling to make electrical connection with the contact terminals of a counterpart socket member on the adjoining car.

2. In an automatic electric train line coupling, the combination with a socket member supported at the end of the car and having a series of contact terminals connected to the respective train line circuits, of a removable rigid plug member having corresponding electrical contacts at its opposite ends and adapted to make connection by a relative longitudinal movement with the socket member, a flexible connection for attaching the plug member to the socket member, said plug member being inserted in the socket member on one car and actuated by the coming together of the cars in the act of coupling to make electrical connection with the contact terminals of a counterpart socket member on the adjoining car.

3. In an automatic electric train line coupling, the combination with a socket member supported at the end of the car and having a series of contact terminals connected to the respective train line circuits, of a removable rigid plug member having corresponding electrical contacts at its opposite ends and adapted to make connection by a relative longitudinal movement with the socket member, said plug member being inserted in the socket member on one car and actuated by the coming together of the cars in the act of coupling to make electrical connection with the contact terminals of a counterpart socket member on the adjoining car, the contact points at one end of the plug member at one side of a vertical center line being cross connected with the corresponding contacts on the other side of the center line at the other end of the plug.

In testimony whereof I have hereunto set my hand.

THOMAS R. BROWN.

Witnesses:
A. M. CLEMENTS,
S. W. KEEFER.

Copies of this patent may be obtained for five cents each, by addressing the "Commissioner of Patents, Washington, D. C."